J. S. TOD.
WATERING TROUGH.
APPLICATION FILED JUNE 21, 1912.
1,042,056.
Patented Oct. 22, 1912.
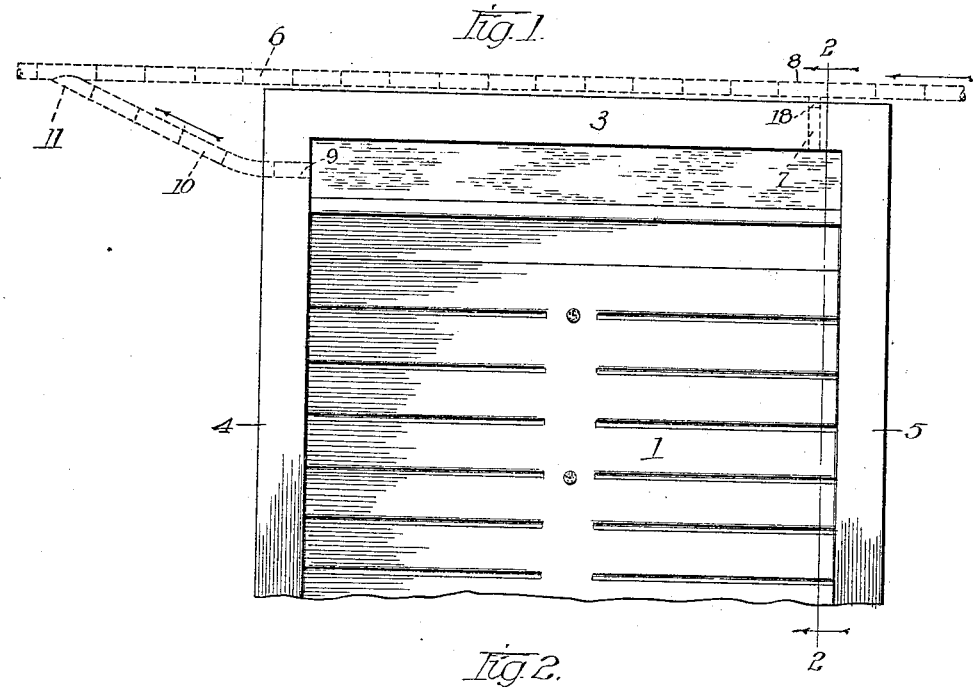
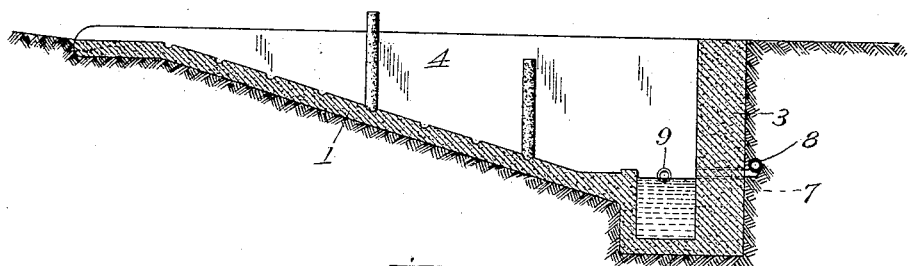
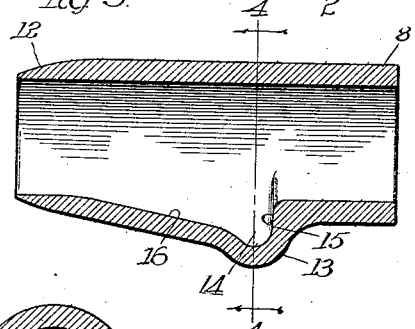
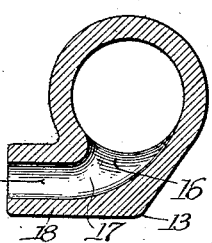
Witnesses:
Robert H. F. Weir
N. Perry Hahn
Inventor
James S. Tod
James Addington, Ames Seibold
Attys
COLUMBIA PLANOGRAPH CO., WASHINGTON, D. C.

UNITED STATES PATENT OFFICE.

JAMES S. TOD, OF ROCK ISLAND, ILLINOIS.

WATERING-TROUGH.

1,042,056.

Specification of Letters Patent.

Patented Oct. 22, 1912.

Application filed June 21, 1912. Serial No. 705,138.

*To all whom it may concern:*

Be it known that I, JAMES S. TOD, a citizen of the United States, residing at Rock Island, in the county of Rock Island and State of Illinois, have invented new and useful Improvements in Watering-Troughs, of which the following is a full, clear, concise, and exact description, reference being had to the accompanying drawing, forming a part of this specification.

My invention relates to improvements in watering troughs adapted to be supplied with water from drains located in the fields, and particularly to means for supplying such troughs with water.

One of the objects of my invention is to provide a take-off section or a take-off tile for use in the drains, by which the water in the drain may be taken off and supplied to a suitable water trough located in the field, which take-off tile will insure a supply of water being fed to the trough as long as there is any water in the drain, and which will not become clogged or stopped up by sediment or the like which may enter the drain.

Other objects of my invention will appear more fully in the following specification and claims.

For the purpose of disclosing my invention I have illustrated one embodiment thereof in the accompanying drawings, in which—

Figure 1 is a plan view of a watering trough embodying my invention; Fig. 2 is a sectional view thereof, taken on the line 2—2 of Fig. 1; Fig. 3 is a longitudinal sectional view of my improved take-off tile; and Fig. 4 is a transverse sectional view thereof, taken on the line 4—4 of Fig. 3.

Where the soil is damp or water is apt to accumulate on the surface, it is customary to lay one or more lines of drain pipe a greater or less distance below the surface for draining off the water. These drains are constructed from short lengths of tile which are laid end to end through the length of the drain, and as the water seeps down through the ground it enters the drain through the tile and the interstices between the various sections of tile and is thus drained off from the field. My watering trough contemplates using the water thus drained for supplying the trough with fresh water at all times.

In constructing the trough I provide an inclined runway 1, which is preferably of concrete, though it may be made of other permanent material, having its lower end below the surface of the ground. This runway at its lower end terminates in a watering trough 2, which is likewise preferably formed of concrete and has its rear wall 3 extending upwardly to the surface of the ground. Suitable side walls 4 and 5 are provided for the runway and trough to prevent the dirt from falling in. This trough is located beside the drain 6, and water is supplied to the trough from the drain by a supply pipe 7 which connects with the take-off section 8 interposed in the line of tile. This supply pipe is located at the up-stream end of the trough, and at the down-stream end of the trough I provide an overflow opening 9 which communicates with a short drain section 10 terminating in a Y-section 11 of tile interposed in the line of tile forming the drain 6. By this arrangement it will be noted that water flowing through the tile will enter the trough through the supply pipe 7 and will overflow through the pipe 9 back into the drain 6, whereby a fresh supply of water is always kept flowing through the trough.

The take-off tile section 8 is of peculiar construction to insure a supply of water running into the trough as long as there is any water in the drain, and to prevent roots, sediment, etc., from accumulating in the take-off opening, and thereby clogging the same. This section is preferably cylindrical in form and at its down-stream end is tapered, as at 12, so that it may be inserted a slight distance in the next succeeding tile of the drain. On the under side of the tile section I provide an integrally formed projection 13, which forms inside a water basin 14, which is below the inside bottom level of the tile. The up-stream wall 15 of this basin is substantially at right angles to the bottom of the tile, while the down-stream wall 16 inclines from the bottom of the basin to the inside bottom level of the tile. By this arrangement, while a water basin is formed in the projection 13, no projecting portions are formed which would obstruct the passage through the tile of roots and other material that might obstruct the flow of water either through the tile or through the take-off opening in the basin. This basin 14 communicates with the take-off opening 17 formed in a lateral integrally formed projection 18 extending from the tile.

Having thus described my invention, what I claim as new and desire to secure by Letters Patent, is—

1. In apparatus of the class described, a drain tile section having a water basin formed therein below the level of the tile, a drain formed of a plurality of sections of tile in which said first-named section is interposed, a watering trough or the like positioned adjacent said drain, said first-named section having a take-off opening leading from said water basin and communicating with said watering trough for supplying the latter with water from said drain.

2. In apparatus of the class described, a drain tile section for taking off water from a line of drain pipe to supply a watering trough or the like, said section having a water basin formed therein below the inside bottom level of the tile, and having a lateral take-off opening leading from said basin for the purpose described.

3. In apparatus of the class described, a drain tile section for taking off water from a line of drain pipe for supplying water to a watering trough or the like, said tile having a water basin formed therein below the inside bottom level of the tile, the up-stream wall of said basin being substantially at right angles to the bottom of the tile, and the down-stream wall of said basin being inclined from the bottom of the basin to the inside bottom wall of the tile, said basin having a lateral take-off opening leading therefrom for the purpose described.

In witness whereof, I have hereunto subscribed my name in the presence of two witnesses.

JAMES S. TOD.

Witnesses:
WILLIAM C. ALLEN,
BESSIE BAKER.

---

Copies of this patent may be obtained for five cents each, by addressing the "Commissioner of Patents, Washington, D. C."